United States Patent
Mishra et al.

(10) Patent No.: US 11,025,444 B2
(45) Date of Patent: Jun. 1, 2021

(54) MULTICAST TRAFFIC OPTIMIZATION IN MULTIHOMED EDGE NETWORK ELEMENTS

(71) Applicant: Cisco Technology, Inc., San Jose, CA (US)

(72) Inventors: Mankamana Mishra, Dublin, CA (US); Swadesh Agrawal, San Jose, CA (US); Ali Sajassi, San Ramon, CA (US); Ijsbrand Wijnands, Leuven (BE); Samir Thoria, Saratoga, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 64 days.

(21) Appl. No.: 16/133,000

(22) Filed: Sep. 17, 2018

(65) Prior Publication Data

US 2020/0092122 A1    Mar. 19, 2020

(51) Int. Cl.
| | |
|---|---|
| *H04L 12/18* | (2006.01) |
| *H04L 12/723* | (2013.01) |
| *H04L 1/00* | (2006.01) |
| *H04L 12/761* | (2013.01) |

(52) U.S. Cl.
CPC ........ *H04L 12/1859* (2013.01); *H04L 12/185* (2013.01); *H04L 12/1895* (2013.01); *H04L 45/50* (2013.01); *H04L 45/16* (2013.01); *H04L 2001/0093* (2013.01)

(58) Field of Classification Search
None
See application file for complete search history.

(56) References Cited

U.S. PATENT DOCUMENTS

| 8,953,590 B1 | 2/2015 | Aggarwal et al. |
| 2012/0131216 A1 | 5/2012 | Jain et al. |
| 2012/0230335 A1 | 9/2012 | Filsfils et al. |

(Continued)

OTHER PUBLICATIONS

H. Holbrook, "Source-Specific Multicast for IP", Network Working Group, Request for Comments: 4607, Category: Standards Track, https://tools.ietf.org/pdf/rfc4607.pdf, Aug. 2006, 19 pages.

(Continued)

*Primary Examiner* — Kouroush Mohebbi
(74) *Attorney, Agent, or Firm* — Edell, Shapiro & Finnan, LLC

(57) ABSTRACT

A computer network efficiently provides a multicast network flow to a multicast recipient across a multihomed network element. The multihomed network element includes network devices that receive multicast data from a source of a multicast network flow. Each particular network device that received the multicast data publishes a notification indicating that the multicast network flow is available from the particular network device. The computer network receives a subscription to the multicast network flow from a multicast recipient, and determines whether to bridge the multicast data across the multihomed network element based on a multicast configuration of the computer network. The multihomed network element provides the multicast data to the multicast recipient from at least one of the particular network devices that received the multicast data from the source of the multicast network flow.

20 Claims, 7 Drawing Sheets

(56) References Cited

U.S. PATENT DOCUMENTS

2013/0021942 A1    1/2013  Bacthu et al.
2019/0036717 A1*   1/2019  Kebler .............. H04L 65/4076
2020/0007358 A1*   1/2020  Bidgoli ................ H04L 45/16

OTHER PUBLICATIONS

R. Aggarwal et al., "BGP Encodings and Procedures for Multicast in MPLS/BGP IP VPNs", Internet Engineering Task Force (IETF), Request for Comments: 6514, Category: Standards Track, ISSN: 2070-1721, Feb. 2012, 59 pages.

* cited by examiner

MULTICAST TRAFFIC OPTIMIZATION IN MULTIHOMED EDGE NETWORK ELEMENTS

TECHNICAL FIELD

The present disclosure relates to reducing unnecessary multicast traffic in computer networks.

BACKGROUND

Multicast traffic in a computer network is typically provided according to a publish/subscribe model. For instance, a source of multicast traffic will publish the availability of a multicast network flow on a particular network address (e.g., Internet Protocol (IP) address and port). The recipients will subscribe to the multicast network flow and have any data that is sent to that particular network address forwarded to the recipient/subscriber. In some instances, an intermediary network element may act as an aggregation point for multicast traffic, and coordinate the forwarding of the published multicast data to the endpoints of the subscriber.

Multihomed network elements provide redundancy and reliability by load balancing network traffic across multiple network devices. Multihomed network elements may be configured with one or more primary/active devices and optionally one or more secondary/backup devices. If a multihomed network element includes a plurality of active network devices, then the network traffic directed to the multihomed network element may be directed to each active network device according to a hashing algorithm. For instance, an edge gateway may calculate a hash of the source network address and destination network address, and assign each hash value to one of the network devices in the multihomed network element. Alternatively, different implementations of a hashing algorithm may include a hashing parameter other than source network address and destination network address. In this case, traffic with the same source and destination addresses may be hashed and distributed across all of the active devices in the multihomed network element.

DESCRIPTION OF EXAMPLE EMBODIMENTS

Overview

Figure 1:
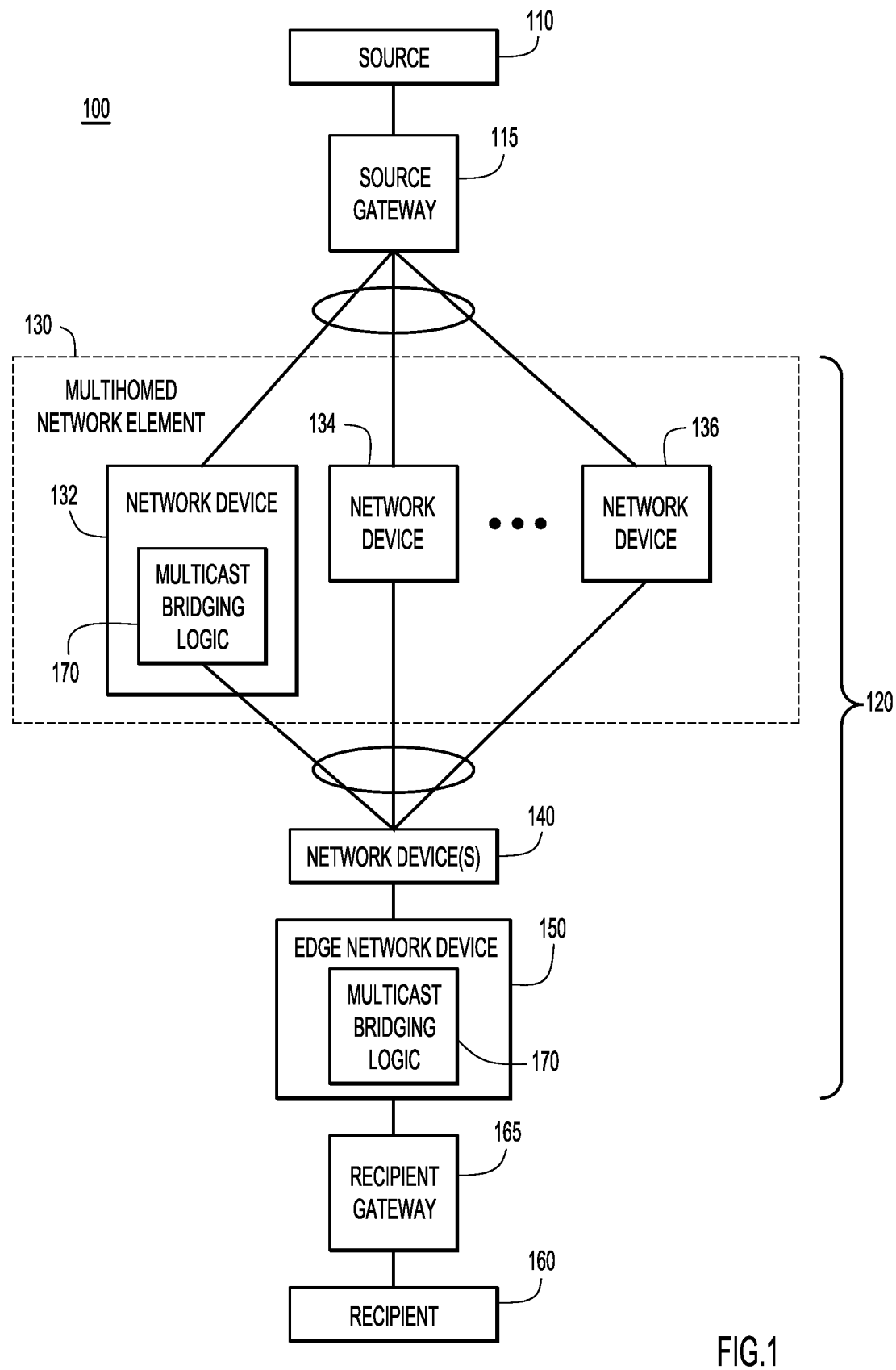
FIG. 1 is a simplified block diagram of a computer network configured to forward multicast network traffic through a multihomed network element, according to an example embodiment.

Presented herein are techniques enabling a computer network to efficiently provide a multicast network flow across a multihomed network element. The multihomed network element comprising a plurality of network devices receives multicast data from a source of a multicast network flow. Each particular network device that received the multicast data publishes a notification indicating that the multicast network flow is available from the particular network device. The computer network receives a subscription to the multicast network flow from a multicast recipient, and determines whether to bridge the multicast data across the multihomed network element based on a multicast configuration of the computer network. The multihomed network element provides the multicast data to the multicast recipient from at least one of the particular network devices that received the multicast data from the source of the multicast network flow.

DETAILED DESCRIPTION

When a multicast source is connected to a multihomed network element with multiple active network devices, some of the multicast traffic may be hashed and routed to different network devices, which may lead to traffic loss. For instance, a recipient of a multicast traffic stream may subscribe to the multicast stream at only one of the network devices in the multihomed network element. In this instance, any packets that are hashed to a different network device would be lost to the recipient. In the case of multiple active network devices, any traffic (e.g., control plane or data plane) from the multicast source would be load balanced between the multiple active devices. Typically, the load balancing algorithm is controlled by a gateway network element of the multicast source, and the multihomed network element does not have any control over which traffic is load balanced to each network device.

In one example, the multicast traffic may be distributed/hashed by the source gateway to multiple network devices in the multihomed network element. The source gateway may use any hashing algorithm to distribute multicast flows, which may have the same multicast source and multicast group, such that packets from a single flow may be hashed to multiple network devices. In one specific example, the source gateway hashes the multicast traffic based on the 5-tuple of the network flow (e.g., <source IP address, source port, multicast group IP address, multicast group port, protocol>), allowing traffic to be hashed to different devices in the multihomed network element. For instance, different sources, which have a different source port, may each send traffic to the multicast group. Since the source network address (i.e., the source port) is different for each source, the multicast traffic may be spread across multiple network devices by the hashing algorithm at the source gateway. In a specific example, a user chat system may collect input for the multicast group (e.g., the users who subscribe to the multicast network flow) from different user devices that use different network addresses (e.g., source ports).

Once the multicast source has begun sending multicast traffic to the source gateway, and the source gateway has hashed the traffic to multiple network devices in the multihomed network element, a recipient of the multicast network flow may subscribe to the multicast network flow to receive the multicast traffic. In one example, an edge network element of the core network between the source and the recipient may be eligible to send a subscription (e.g., Internet Group Management Protocol (IGMP) join message, a Protocol (Independent Multicast (PIM) join message, a Multicast Label Distribution Protocol (MLDP) join message, etc.) to the source. As the recipient edge network element determines the best path through the core network to the multihomed network element that published the multicast network flow, the core network would typically only send the subscription to the network device that is on the best path to the source. If some or all of the multicast traffic is hashed to a different network device than the network device that received the subscription, then the recipient would receive only some or none of the multicast traffic.

One method of solving the potential for loss of multicast traffic in multihomed network elements is simply to bridge every multicast packet to all of the active network devices in the multihomed network element. The multicast packets may be bridged using a dedicated Layer 2 link or via labeled traffic via the core network. However, in this method, every multicast packets would be bridged to every network device in the multihomed network element, which is not a scalable solution as the amount of multicast traffic and/or the number of network devices in the multihomed network element increases.

The techniques described herein provide a means to ensure that a core network does not lose multicast traffic at a multihomed network element, but also does not bridge multicast traffic unnecessarily. The examples described herein may improve core networks that are configured with different multicast configurations. For instance, one core network may be implemented with a PIM configuration in which individual network elements of the core network do not necessarily store information on the core network topology. Alternatively, another core network may be implemented with an MLDP configuration in which network elements may route traffic along specified routes (e.g., Point-to-MultiPoint (P2MP) trees) within the network.

Referring now to FIG. 1, a simplified block diagram illustrates a multicast system 100 configured to convey multicast traffic from a source 110. The source 110 publishes multicast data in a multicast network flow and sends the data through a source gateway network element 115 to a core network 120. The source gateway 115 is connected to a multihomed network element 130 in the core network 120. The multihomed network element 130 includes a plurality of network devices 132, 134, and 136. Though the multihomed network element 130 is shown with three network devices, other examples may include two or more network devices. The core network 120 also includes one or more internal network devices 140 and a recipient edge network device 150. The recipient edge network device 150 is connected to a recipient 160 of the multicast network flow through a recipient gateway 165.

In one example, the core network 120 may be configured with a PIM multicast configuration that does not maintain information on the topology of the core network 120 to forward the multicast network flow from the multihomed network element 130 to the recipient edge network element 150. Alternatively, the core network 120 may be configured with an MLDP multicast configuration that generates and maintains P2MP trees to forward the multicast network flow to the recipient edge network element 150.

In another example, the multihomed network element 130 may comprise the network devices 132, 134, and 136 configured as an Ethernet Virtual Private Network (EVPN) redundancy group. To optimize the flow of multicast traffic in network devices that only have independent PIM tables, the multihomed network element 130 may bridge multicast traffic between network devices (e.g., Provider Edge (PE) routers) only when necessary. The multihomed network element only needs to bridge data traffic when one network device in the redundancy group receives a PIM join message and multicast data is being received at different network devices in the redundancy group. One method for optimizing the bridging of data traffic is for each network device 132, 134, 136 to avoid bridging traffic unless they receive a PIM join synchronization message (e.g., via EVPN). Any network device that receives a PIM join message for which the accepting interface is a Bridge Virtual Interface (BVI), or Integrated Routing and Bridging (IRB) interface, and the Bridge Domain (BD) associated with the IRB is multihomed enabled, would synchronize the PIM state with its peer network device(s) if the network device has received a notification of an active source behind the peer network device. In other words, multicast traffic is bridged between network devices of a multihomed network element on demand.

In a further example, the core network 120 may be configured with a modified MLDP signaling procedure to support multicasting through multihomed network elements. If the multicast network flow is hashed to multiple PE routers (e.g., network devices 132, 134, and 136) then each PE will publish a multicast route to all of the remote PE routers (e.g., network device 150) in the core network 120. If the core network 120 includes a Router Reflector (RR), the RR will deliver all of the published multicast routes to all of the PE routers in the core network 120. The multicast routes are published (e.g., via Border Gateway Protocol (BGP)) with the originator of the multicast route. For instance, network device 132 may send a BGP update publishing a multicast route specifying <network device 132 address, source 110 address, multicast group address>.

When the PE router (e.g., network device 150) connecting the multicast recipient 160 to the core network 120 receives a subscription for the multicast network flow, the PE router sends MLDP join messages to all of the PEs that have published multicast routes for the multicast network flow. If multiple PE routers (e.g., network device 132 and network device 134) have published active routes, then multiple join messages will be sent from the remote PE (e.g., network device 150). Each join message will build a multicast forwarding state (e.g., a P2MP tree) rooted at each publishing PE. For instance, the network device 150 may send join messages to both network device 132 and network device 134 if both of those network devices have published multicast routes. In this instance, multicast traffic will now be delivered from each of the network devices in the multihomed network element that received multicast data from the source, and the multicast data will be delivered via corresponding P2MP trees rooted at the network devices in the multihomed network element.

In yet another example, one or more of the network devices 132, 134, 136 in the multihomed network element 130 may lose connectivity to the source gateway 115 and the source 110. When any of the network devices determines that it can no longer provide the multicast data, then that network device will withdraw the publication of the multicast route and notify the remote network devices (e.g., network device 150) that the previously published multicast route is no longer valid. If the other network devices in the multihomed network element 130 still have connectivity to the source 110, then they will maintain their published routes, despite the loss of connectivity of the peer network device.

Figure 2:
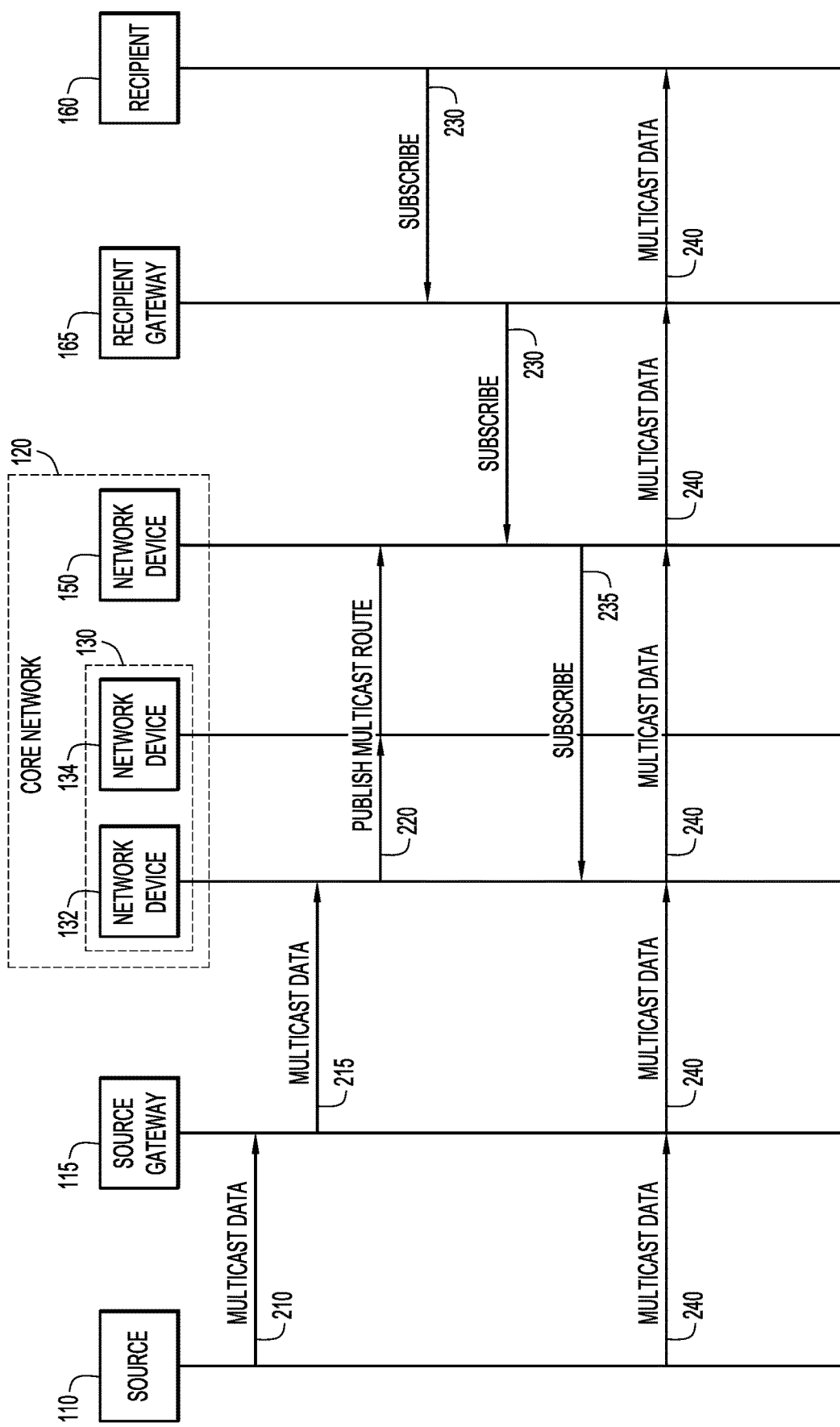
FIG. 2 is a message flow diagram illustrating messages passed from a multicast source to a multicast recipient through a multihomed network element, according to an example embodiment.

Referring now to FIG. 2, a message flow diagram shows an example of messages exchanged to subscribe a recipient 160 to a multicast network flow from source 110 through a core network 120 with a multihomed network element 130. Initially, the source 110 begins sending multicast data 210 to a source gateway 115. In one example, the source gateway 115 and the source 110 are both connected to the same computer network (e.g., a Local Area Network (LAN)), and the source gateway 115 provides network connectivity outside the local computer network. The source gateway 115 sends the data 215 to the multihomed network element 130 in the core network 120. The source gateway 115 load balances the multicast data 215 to a particular network device 132 in the multihomed network element 130 according to specified criteria and algorithms. In one example, the source gateway 115 hashes the 5-tuple of the multicast data packet 210 to determine that the multicast data packet 215 should be sent to the network device 132. Once the network device 132 receives the multicast data packet 215, the network device 132 publishes the availability of a multicast route 220 to all of the network devices in the core network 120, including another network device 134 in the multihomed network element 130 and a recipient edge network device 150. In one example, the multicast route 220 may be specified by a source network address (e.g., IP address) of source 110 and a multicast destination address.

The recipient device 160 sends a subscription message 230 that specifies that traffic from the multicast network flow should be forwarded to the recipient 160. A recipient gateway 165 forwards the subscription 230 to the core network 120. In one example, the recipient gateway 165 and the recipient 160 are both connected to the same computer network (e.g., LAN), and the recipient gateway 165 provides network connectivity outside the local computer network. The network device 150 receives the subscription 230 from the recipient gateway 165 and determines that the network device 150 has previously received the published multicast route 220 that corresponds to the subscription 230. In response, the network device 150 sends the subscription 235 to the network device 132 that published the multicast route 220.

After the subscription 235 has been received by the multihomed network element 130 at the network device 132, the multicast network flow is forwarded through the core network 120 when new multicast data packets 240 are received at the core network 120. The source 110 sends the multicast data 240 to the source gateway 115, which load balances the multicast data 240 to the network device 132 of the multihomed network element 130. The network device 132 forwards the multicast data 240 to the recipient via the network device 150 and the recipient gateway 165. Since the multicast data is only being sent to a single network device in the multihomed network element 130 (i.e., network device 132), the subscription 235 that reaches that network device 132 captures all of the subsequent multicast data 240.

Figure 3:
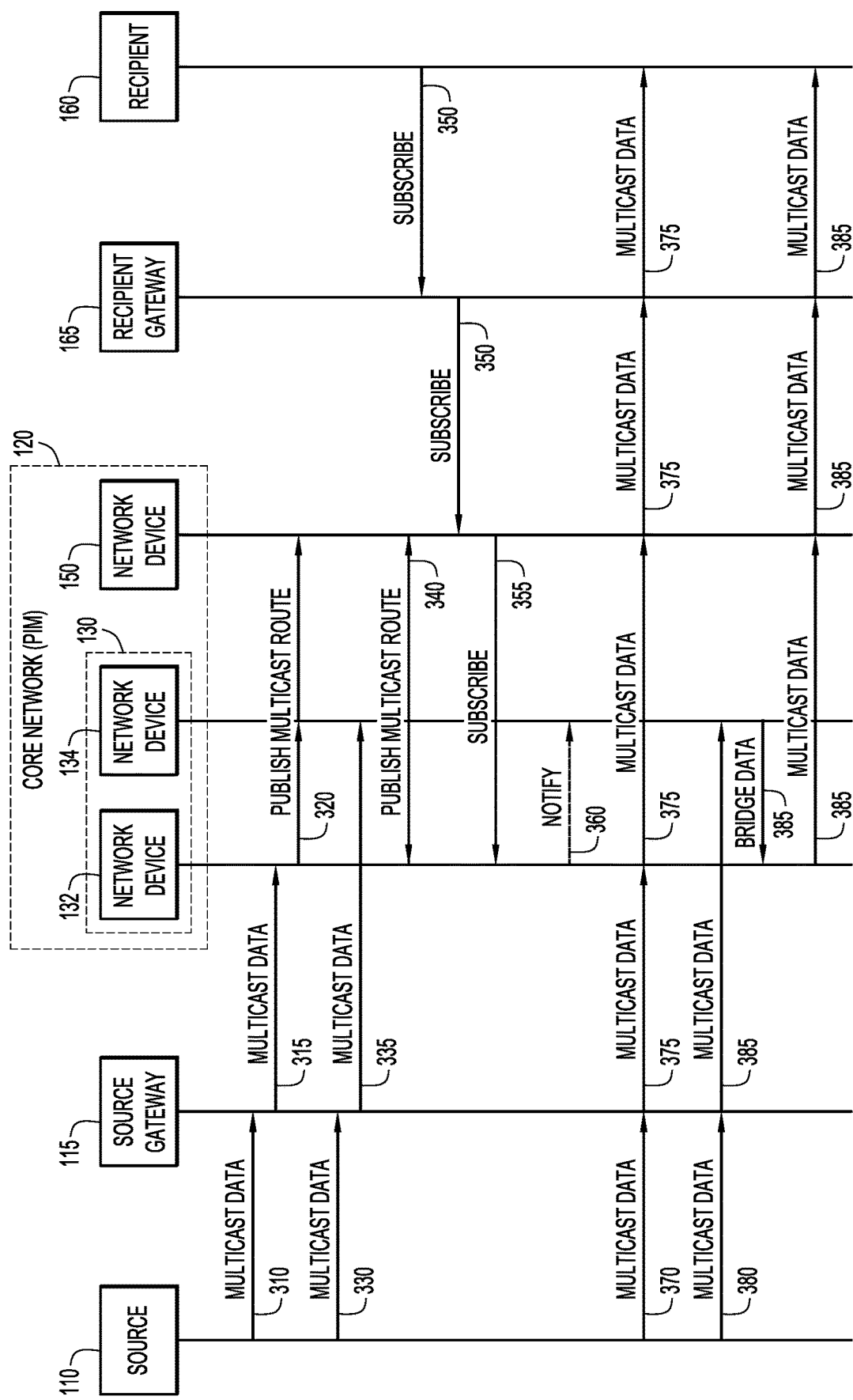
FIG. 3 is a message flow diagram illustrating messages passed from a multicast source to a multicast recipient through a multihomed network element in a computer network with a first multicast configuration, according to an example embodiment.

Referring now to FIG. 3, a message flow diagram shows an example of messages exchanged to subscribe a recipient 160 to a multicast network flow from source 110 through a core network 120 configured with a PIM multicast configuration. While the example will be described with respect to a PIM configuration, other multicast configurations that do not disseminate network topology information throughout the network devices may also benefit from the techniques described with respect to FIG. 3. Initially, the source 110 sends multicast data 310 to the source gateway 115. The source gateway 115 load balances the data packet to the multihomed network element 130 and sends the multicast data 315 to the network device 132 of the multihomed network element 130. In response to receiving the multicast data 315, the network device 132 publishes the availability of a multicast route 320 to all of the network devices in the core network 120, including another network device 134 in the multihomed network element 130 and a recipient edge network device 150. In one example, the multicast route 320 may be specified by a source network address (e.g., IP address) of source 110 and a multicast destination address.

The source 110 also sends multicast data 330 to the source gateway 115. The source gateway 115 load balances the data packet to the multihomed network element 130 and sends the multicast data 335 to the network device 134 of the multihomed network element 130. In response to receiving the multicast data 335, the network device 134 publishes the availability of a multicast route 340 to all of the network devices in the core network 120, including the other network devices (e.g., network device 132) in the multihomed network element 130 and the recipient edge network device 150. In one example, the multicast route 340 may be specified by the same source network address (e.g., IP address) of source 110 and multicast destination address as the multicast route 320.

In another example, the source 110 sending the multicast data 310 and 330 may be one or more devices, and the source gateway 130 may use any criteria and/or algorithms to load balance the multicast data 310 and 330 to different network devices in the multihomed network element 130. For instance, load balancing based on a hash of the 5-tuple of <source IP address, source port, multicast IP address, multicast port, transport protocol> may result multicast data 310 and 330 being sent to network device 132 and network device 134 due to a difference in source port. In this instance, the multicast routes 320 and 340 published in response to load balanced multicast data 315 and 335, respectively, may identify the multicast network flow identically (e.g., with the source IP address and multicast IP address).

The recipient device 160 sends a subscription message 350 that specifies that traffic from the multicast network flow should be forwarded to the recipient 160. A recipient gateway 165 forwards the subscription 350 to the core network 120. In one example, the recipient gateway 165 and the recipient 160 are both connected to the same computer network (e.g., LAN), and the recipient gateway 165 provides network connectivity outside the local computer network. The network device 150 receives the subscription 350 from the recipient gateway 165 and determines that the network device 150 has previously received multicast routes 320 and 340 that both correspond to the subscription 350. The network device 150 sends a subscription 355 to the network device 132 to join the multicast route 320. In one example, the network device 150 sends the subscription 355 to the network device 132 instead of network device 134 because the path finding of the core network 120 determines that the path to the network device 132 is shorter than the path to the network device 134.

In response to receiving the subscription 355 from the network device 150 and receiving the multicast route 340 from the network device 134, the network device 132 may send a notification 360 to the network device 134. The notification 360 informs the network device 134 that the network device 132 has received a subscription 355 that matches the published multicast route 340, and causes the network device 134 to bridge any multicast data that would be sent along multicast route 340 to the network device 132. In other words, the network device 132 notifies that network device 134 that any traffic for the multicast network flow will be handled by the network device 132, and that the network device 134 needs to bridge any packets in the multicast network flow over to the network device 132.

Alternatively, the network device 134 may detect both the published multicast route 320 from the network device 132 and the subscription 355 to the network device 132, and determine that the network device 132 will be handling the multicast network flow. In this instance, no explicit notification message 360 needs to be sent, and the network device 134 will bridge any multicast data in the multicast network flow to the network device 132.

When the source 110 sends multicast data 370 to core network 120, the source gateway 115 load balances the multicast traffic 375 to the network device 132 of the multihomed network element 130. The network device 132, having received the subscription 355, forwards the multicast data 375 to the recipient 160 via the network device 150 and the recipient gateway 165. When the source 110 sends multicast data 380 to core network 120, the source gateway 115 load balances the multicast traffic 385 to the network device 134 of the multihomed network element 130. The network device 134, having received the notification 360, bridges the multicast data 385 to the network device 132, which then forwards the multicast data 385 to the recipient 160 via the network device 150 and the recipient gateway 165.

Figure 4:
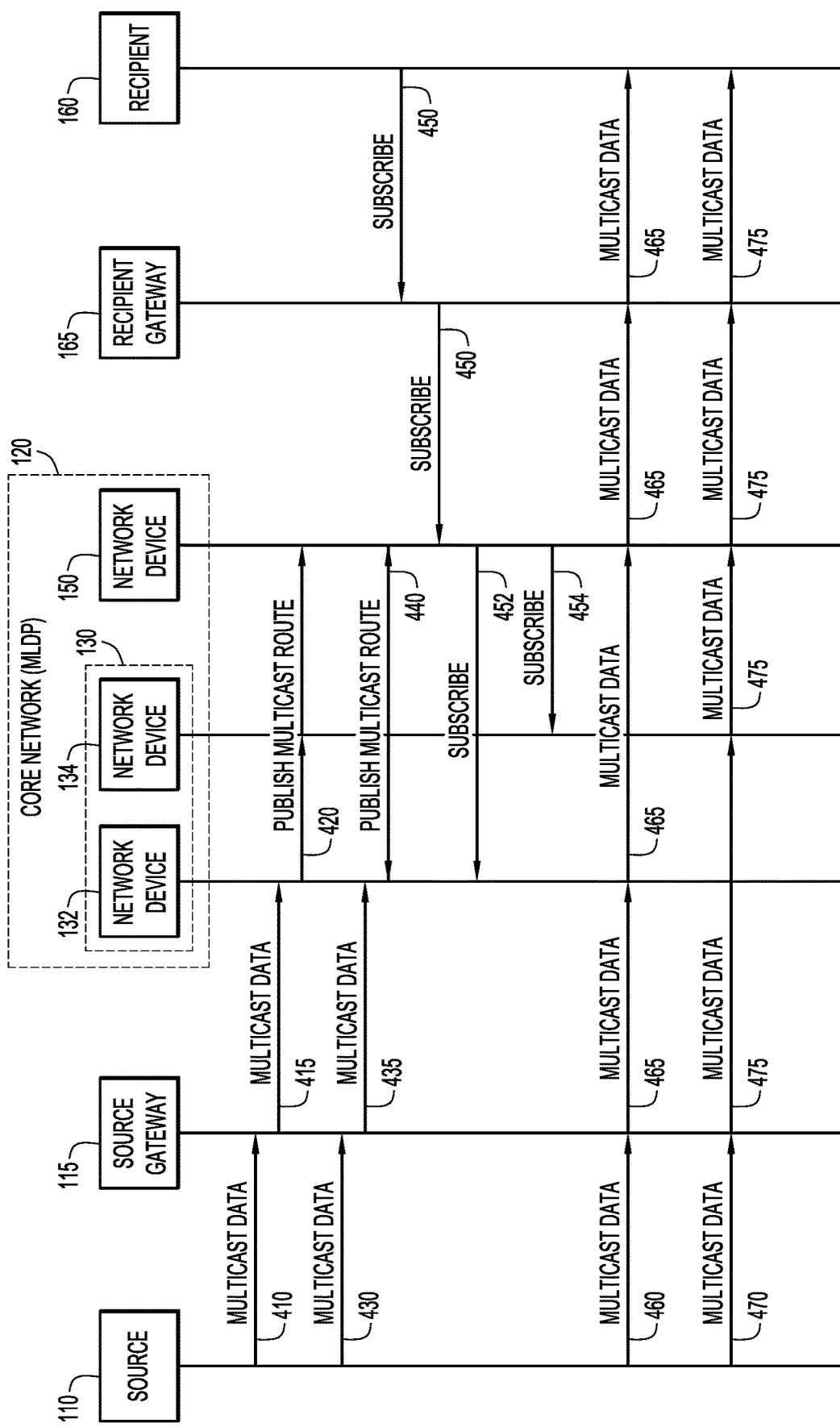
FIG. 4 is a message flow diagram illustrating messages passed from a multicast source to a multicast recipient through a multihomed network element in a computer network with a second multicast configuration, according to an example embodiment.

Referring now to FIG. 4, a message flow diagram shows an example of messages exchanged to subscribe a recipient 160 to a multicast network flow from source 110 through a core network 120 configured with a topology-aware multicast configuration, such as MLDP. Similar to the example described in FIG. 3, the source 110 sends multicast data 410 to the source gateway 115. The source gateway 115 load balances the data packet to the multihomed network element 130 and sends the multicast data 415 to the network device 132 of the multihomed network element 130. In response to receiving the multicast data 415, the network device 132 publishes the availability of a multicast route 420 to all of the network devices in the core network 120, including another network device 134 in the multihomed network element 130 and a recipient edge network device 150. In one example, the multicast route 420 may be specified by a source network address (e.g., IP address) of source 110 and a multicast destination address. In another example, the multicast route 420 may be a P2MP tree rooted at the network device 132.

The source 110 also sends multicast data 430 to the source gateway 115. The source gateway 115 load balances the data packet to the multihomed network element 130 and sends the multicast data 435 to the network device 134 of the multihomed network element 130. In response to receiving the multicast data 435, the network device 134 publishes the availability of a multicast route 440 to all of the network devices in the core network 120, including the other network devices (e.g., network device 132) in the multihomed network element 130 and the recipient edge network device 150. In one example, the multicast route 440 may be a P2MP tree rooted at the network device 134.

The recipient device 160 sends a subscription message 450 that specifies that traffic from the multicast network flow should be forwarded to the recipient 160. A recipient gateway 165 forwards the subscription 450 to the core network 120. In one example, the recipient gateway 165 and the recipient 160 are both connected to the same computer network (e.g., LAN), and the recipient gateway 165 provides network connectivity outside the local computer network. The network device 150 receives the subscription 450 from the recipient gateway 165 and determines that the network device 150 has previously received multicast routes 420 and 440 that both correspond to the subscription 450. The network device 150 sends a subscription 452 to the network device 132 to join the multicast route 420. Additionally, the network device 150 sends a subscription 454 to the network device 134 to subscribe to the multicast route 440. Unlike the PIM configured core network described with respect to FIG. 3, in which the published multicast routes may be indistinguishable, the multicast routes 420 and 440 each specify a particular route through the core network 120. The network device 150 differentiates between the two multicast routes 420 and 440 and determine that the recipient should receive multicast traffic from both multicast routes 420 and 440 to receive all of the traffic in the multicast network flow.

When the source 110 sends multicast data 460 to core network 120, the source gateway 115 load balances the multicast traffic 465 to the network device 132 of the multihomed network element 130. The network device 132, having received the subscription 452, forwards the multicast data 465 to the recipient 160 via the network device 150 and the recipient gateway 165. When the source 110 sends multicast data 470 to core network 120, the source gateway 115 load balances the multicast traffic 475 to the network device 134 of the multihomed network element 130. The network device 134, having received the subscription 454, forwards the multicast data 475 to the recipient 160 via the network device 150 and the recipient gateway 165. In other words, the network device 150 subscribes to both publish multicast routes 420 and 440 to receive all of the traffic in the multicast network flow from the source 110.

Figure 5:
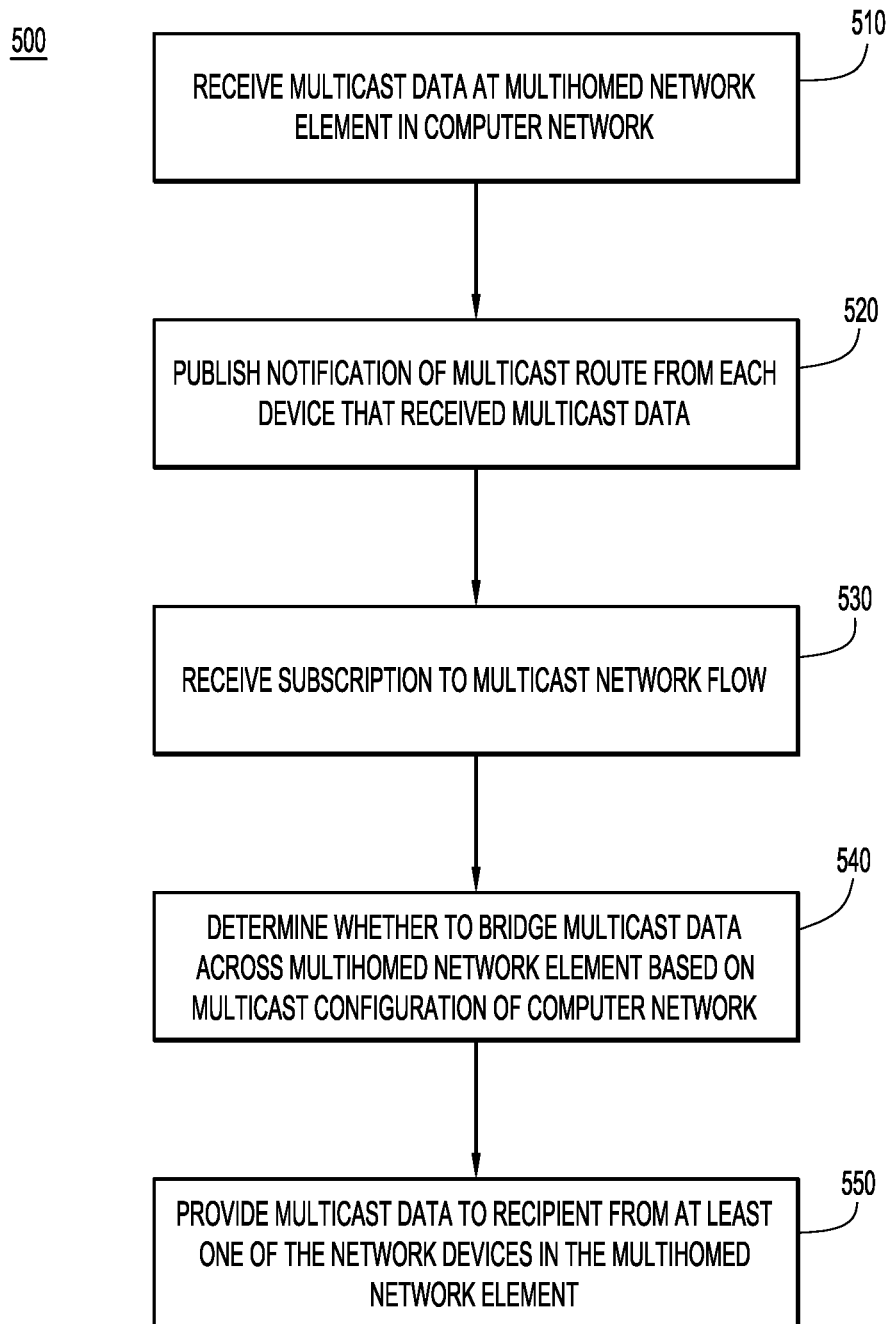
FIG. 5 is a flowchart of a method for providing multicast traffic through a multihomed network element, according to an example embodiment.

Referring now to FIG. 5, a flowchart illustrates a process 500 performed by a computer network to provide multicast data to a recipient without losing any multicast data in a multihomed network element. At 510, the core network receives multicast data at a multihomed network element in the computer network. The multihomed network element comprises a plurality of network devices, and at least one of the network devices in the multihomed network element receives the multicast data from a source of a multicast network flow. At 520, each particular network device that received the multicast data publishes a notification indicating that the multicast network flow is available from that particular network device. In one example, the notification may identify the multicast network flow by a multicast group identifier and the source of the multicast network flow.

At 530, the computer network receives a subscription to the multicast network flow from a multicast recipient. In one example, the subscription is received at an edge network element of the computer network that is connected to a gateway for the recipient. At 540, the computer network determines whether to bridge the multicast data across the multihomed network element based on a multicast configuration of the computer network. In one example, if the multicast configuration of the computer network allows for network devices to publish multicast routes that specifies at least a portion of the topology of the computer network, then the computer network will not bridge the multicast data across the multihomed network element. At 550, the computer network provides the multicast data to the multicast recipient from at least one of the particular network devices that received the multicast data from the source of the multicast network flow. In one example, the computer network may provide the multicast data from all of the particular network devices that received the multicast data from the source of the multicast network flow.

Figure 6:
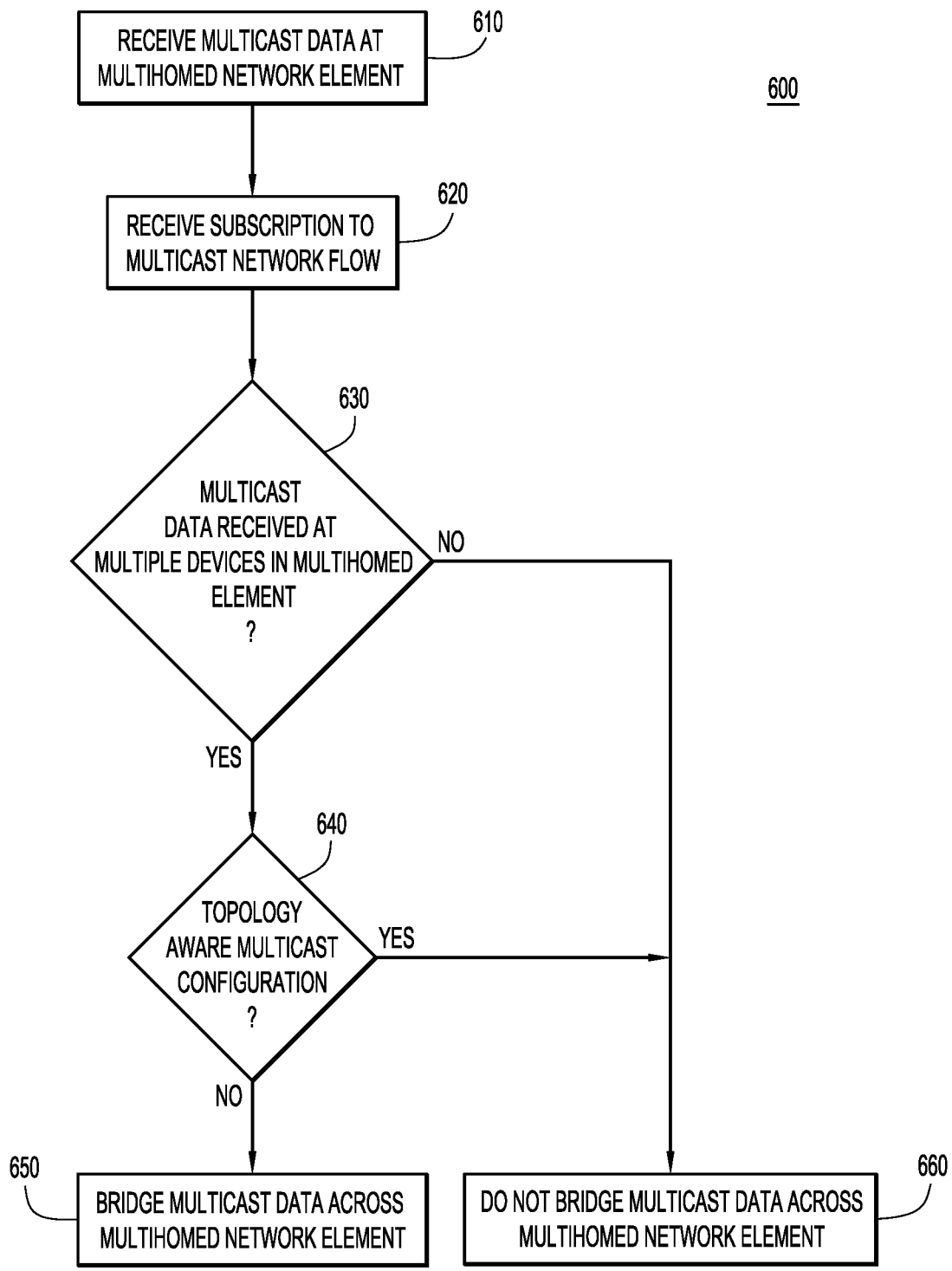
FIG. 6 is a flowchart of a method for reducing bridged network traffic when providing multicast traffic across a multihomed network element, according to an example embodiment.

Referring now to FIG. 6, a flowchart illustrates a process 600 performed by a multihomed network element in a computer network that is configured in a multicast configuration. At 610, the multihomed network element receives multicast data in a multicast network flow from a multicast source. In one example, the multihomed network element receives multicast data at a plurality of network devices. For instance, each network device in the multihomed network element may receive different packets of the multicast network flow. At 620, the multihomed network element receives a subscription for the multicast network flow. In one example, the subscription may be received from an edge network element on the same computer network as the multihomed network element.

At 630, the multihomed network element determines whether the multicast data has been received at multiple network devices in the multihomed network element. If multiple network devices have received multicast data, then the multihomed network element determines whether the computer network is configured with a topology-aware multicast configuration at 640. In one example, a topology-aware multicast configuration may be an MLDP configuration that generates a P2MP tree for each network device that received the multicast data from the source. In another example, a PIM configuration for a computer network is not topology-aware, and published multicast routes from different network devices in the multihomed network element may appear identical to other network devices in the computer network.

If multiple network devices in the multihomed network element received multicast data from the source, as determined at 630, and the computer network is not configured with a topology-aware multicast configuration, as determined at 640, then the multihomed network element bridges the multicast data across the multihomed network element at 650. In one example, all of the multicast data received from each of the network devices is bridged to a single network device in the multihomed network element and that single device forwards all of the multicast data to the recipient of the multicast network flow.

If only a single network device in the multihomed network element received multicast data from the source, as determined at 630, or the computer network is configured with a topology-aware multicast configuration, as determined at 640, then the multihomed network element does not bridge the multicast data across the multihomed network element at 660. In one example, the multihomed network element may provide the multicast from all of the network devices that received multicast data from the source, since the topology-aware computer network configuration enables a recipient edge network element in the computer network to subscribe to all of the multicast routes from the multihomed network element.

Figure 7:
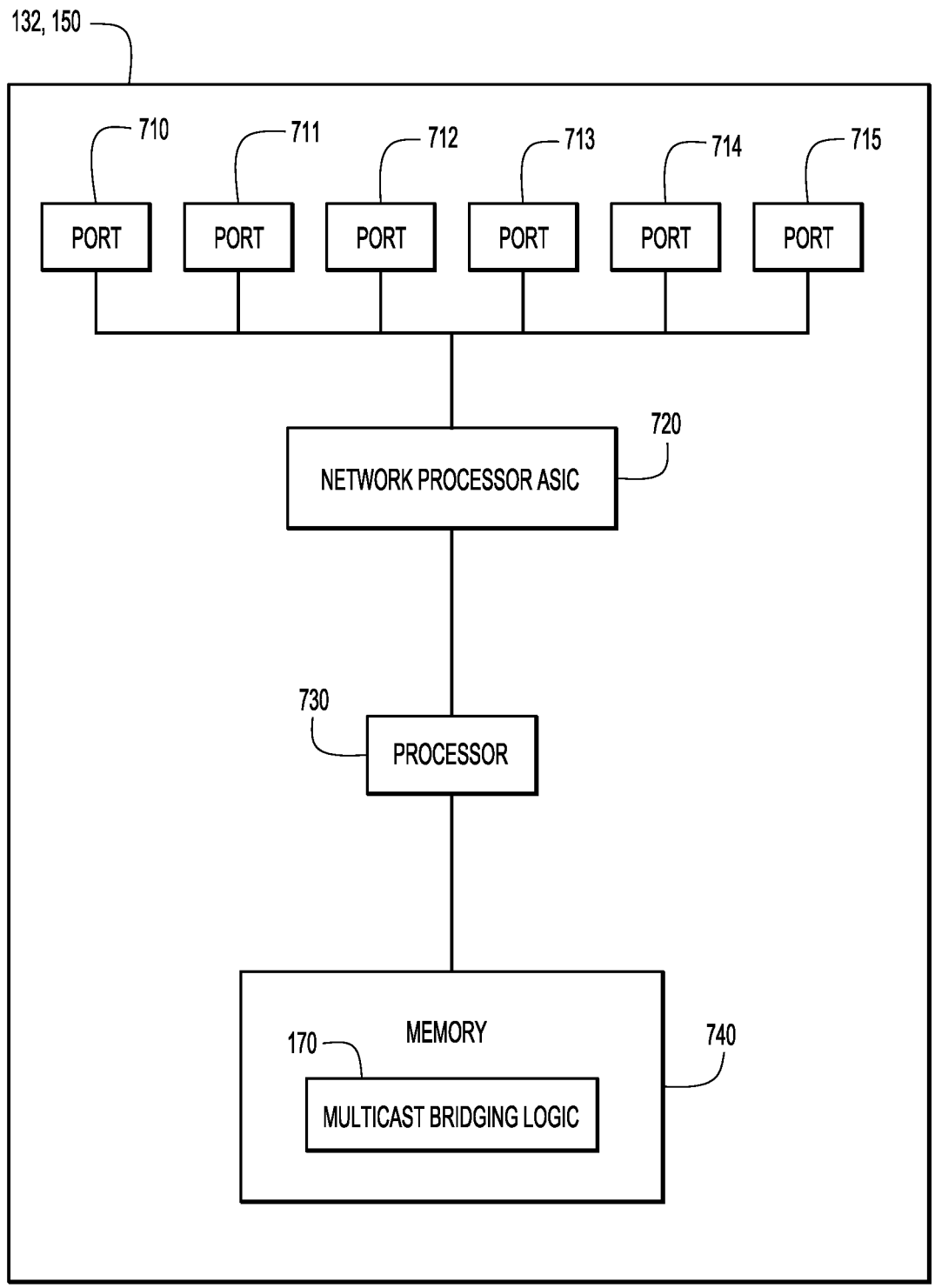
FIG. 7 is a block diagram of a networking device configured to participate in the operations presented herein, according to an example embodiment.

FIG. 7 illustrates a block diagram of a network device, which could be a network device 132 or an edge network device 150, and is configured to participate in the techniques presented herein. The network device includes a network interface unit in the form of a plurality of network ports 710-715, a processor Application Specific Integrated Circuit (ASIC) 720 that performs network processing functions, one or more processors 730 (e.g., microprocessors or microcontrollers), and memory 740. The memory 740 stores the multicast bridging logic 170, which may include instructions for determining whether to bridge multicast data across a multihomed network element. It is to be understood that, in certain examples, the network device may be a virtual (e.g., software-based) appliance.

The memory 740 may include read only memory (ROM), random access memory (RAM), magnetic disk storage media devices, optical storage media devices, flash memory devices, electrical, optical, or other physical/tangible memory storage devices. Thus, in general, the memory 740 may comprise one or more tangible (non-transitory) computer readable storage media (e.g., a memory device) encoded with software comprising computer executable instructions and when the software is executed (by the one or more processors 730) it is operable to perform the operations described herein with reference to a leaf node.

In summary, the techniques presented herein provide an efficient way to handle multicast traffic when the source of the multicast traffic is behind a multihomed network element with multiple active devices. The multihomed network element bridges the multicast traffic across the multihomed devices only in conditions that require the traffic to be bridged. Otherwise, the multihomed network element handles the multicast traffic without losing any multicast data and without unnecessary traffic across the multihomed devices.

In one form, a computer-implemented method enables a computer network to efficiently provide a multicast network flow across a multihomed network element. The method comprises receiving at a multihomed network element comprising a plurality of network devices in a computer network, multicast data from a source of a multicast network flow. The method also includes publishing a notification from each particular network device that received the multicast data. The notification indicates that the multicast network flow is available from the particular network device. The method further includes receiving from a multicast recipient, a subscription to the multicast network flow. The method includes determining whether to bridge the multicast data across the multihomed network element based on a multicast configuration of the computer network. The method also includes providing the multicast data to the multicast recipient from at least one of the particular network devices that received the multicast data from the source of the multicast network flow.

In another form, an apparatus comprises a network interface, and a processor. The network interface is configured to communicate with a plurality of network devices of a multihomed network element in a computer network. The processor is configured to receive multicast data from a source of a multicast network flow. The processor is also configured to publish a notification indicating that the multicast network flow is available from the apparatus. The processor is further configured to receive a subscription to the multicast network flow from a multicast recipient and determine whether to bridge the multicast data across the multihomed network element based on a multicast configuration of the computer network. The processor is also configured to cause the network interface unit to provide the multicast data to the multicast recipient.

In a further form, a system is provided that includes a computer network comprising a plurality of network elements is provided. The computer network is configured in a multicast configuration. The computer network includes a multihomed network element comprising a plurality of network devices. One or more particular network devices are configured to receive multicast data from a source of a multicast network flow, publish a notification indicating that the multicast network flow is available from the particular network device, and determine whether to bridge the multicast data across the multihomed network element based on the multicast configuration of the computer network. A recipient edge network element in the computer network is configured to receive a subscription to the multicast network flow from a multicast recipient and send the subscription to at least one of the one or more particular network devices in the multihomed network element. The multihomed network element provides the multicast data to the recipient edge network element from at least one of the particular network device that received the multicast data from the source of the multicast data flow.

In yet another form, one or more non-transitory computer readable media is provided with instructions to cause a processor to perform the techniques described herein with respect to the network devices.

It is to be appreciated that the above examples are not mutually exclusive and may be combined in various arrangements. It is also to be appreciated that the above description is intended by way of example only. Various modifications and structural changes may be made therein without departing from the scope of the concepts described herein and within the scope and range of equivalents of the claims.

What is claimed is:

1. A method comprising:
   at a first network device among a plurality of network devices in a multihomed network element in a computer network, receiving multicast data from a multicast source of a multicast network flow, wherein each of the plurality of network devices in the multihomed network element is on a provider edge connecting the multicast source to the computer network;
   publishing a notification from the first network device that received the multicast data, the notification indicating that the multicast network flow is available from the first network device;
   receiving from a multicast recipient, a subscription to the multicast network flow;
   determining whether to send the multicast data from the first network device to a second network device in the multihomed network element based on a multicast configuration of the computer network; and
   providing the multicast data to the multicast recipient from at least one of the network devices in the multihomed network element.

2. The method of claim 1, wherein the multicast configuration includes a Protocol Independent Multicast (PIM) configuration, the method further comprising:
   receiving the multicast data only at the first network device of the plurality of network devices in the multihomed network element; and
   determining not to send the multicast data from the first network device to the second network device.

3. The method of claim 1, wherein the multicast configuration includes a Protocol Independent Multicast (PIM) configuration, the method further comprising:
   receiving the multicast data at the first network device and the second network device of the plurality of network devices in the multihomed network element;
   receiving the subscription at the first network device; and
   notifying the second network device of the subscription received at the first network device.

4. The method of claim 3, further comprising:
   sending the multicast data received at the second network device to the first network device; and
   providing the multicast data to the multicast recipient from the first network device.

5. The method of claim 1, wherein the multicast configuration includes a Multicast Label Distribution Protocol (MLDP) configuration, the method further comprising:
   receiving the subscription for the multicast network flow at each particular network device that received the multicast data; and
   providing the multicast data to the multicast recipient from each particular network device.

6. The method of claim 5, further comprising:
   generating a corresponding Point To MultiPoint (P2MP) tree originating from each particular network device that received the multicast data; and
   providing the multicast data to the multicast recipient along the corresponding P2MP trees.

7. The method of claim 1, wherein the multicast configuration includes a Multicast Label Distribution Protocol (MLDP) configuration, the method further comprising determining not to send the multicast data from the first network device to the second network device in the multihomed network element.

8. The method of claim 1, further comprising:
   detecting that the multicast network flow has stopped; and
   withdrawing the notification from the first network device that received the multicast data.

9. An apparatus comprising:
   a network interface configured to communicate with computing devices including a multicast source of a multicast network flow and a plurality of network devices of a multihomed network element in a computer network, wherein each of the plurality of network devices in the multihomed network element is on a provider edge connecting the multicast source to the computer network; and
   a processor coupled to the network interface, and configured to:
      receive via the network interface, multicast data from the multicast source;
      cause the network interface to publish a notification indicating that the multicast network flow is available from the apparatus;
      receive from a multicast recipient via the network interface, a subscription to the multicast network flow;
      determine whether to send the multicast data from the apparatus to at least one other network device in the multihomed network element based on a multicast configuration of the computer network; and
      cause the network interface to provide the multicast data to the multicast recipient.

10. The apparatus of claim 9, wherein the multicast configuration includes a Protocol Independent Multicast (PIM) configuration, the processor further configured to:
    determine that the apparatus is the only network device in the multihomed network element to receive the multicast data; and
    determine not to send the multicast data to the at least one other network device in the multihomed network element.

11. The apparatus of claim 9, wherein the multicast configuration includes a Protocol Independent Multicast (PIM) configuration, the processor further configured to:
receive the subscription at the apparatus via the network interface; and
notify the at least one other network device in the multihomed network element of the subscription received at the apparatus.

12. The apparatus of claim 11, wherein the network interface is further configured to:
receive the multicast data received at the at least one other network device; and
provide the multicast data to the multicast recipient from the apparatus.

13. The apparatus of claim 9, wherein the processor is further configured to:
generate a Point To MultiPoint (P2MP) tree originating from the apparatus; and
cause the network interface to provide the multicast data to the multicast recipient along the P2MP tree.

14. The apparatus of claim 9, wherein the multicast configuration includes a Multicast Label Distribution Protocol (MLDP) configuration, the processor further configured to determine not to send the multicast data to another network device in the multihomed network element.

15. The apparatus of claim 9, wherein the processor is further configured to:
detect that the multicast network flow has stopped; and
withdraw the notification that the multicast network flow is available from the apparatus.

16. A system comprising:
a multihomed network element on a provider edge of a computer network comprising a plurality of network elements, the computer network being in a multicast configuration, the multihomed network element comprising a plurality of network devices connecting a multicast source of a multicast network flow to the computer network, wherein the plurality of network devices includes a first network device configured to:
receive multicast data from the multicast source;
publish a notification indicating that the multicast network flow is available from the first network device; and
determine whether to send the multicast data from the first network device to a second network device in the multihomed network element based on the multicast configuration of the computer network; and
a recipient edge network element in the computer network, the recipient edge network element configured to:
receive from a multicast recipient, a subscription to the multicast network flow; and
send the subscription to at least one of the plurality of network devices in the multihomed network element,
wherein the multihomed network element provides the multicast data to the recipient edge network element from the first network device that received the multicast data from the multicast source.

17. The system of claim 16, wherein the multicast configuration includes a Protocol Independent Multicast (PIM) configuration, the multihomed network element further configured to:
receive the multicast data only at the first network device of the plurality of network devices; and
determine not to send the multicast data to the second network device in the multihomed network element.

18. The system of claim 16, wherein the multicast configuration includes a Protocol Independent Multicast (PIM) configuration, the multihomed network element further configured to:
receive the multicast data at the first network device and the second network device of the plurality of network devices;
receive the subscription at the first network device;
notify the second network device of the subscription received at the first network device;
send the multicast data received at the second network device to the first network device; and
provide the multicast data to the recipient edge network element from the first network device.

19. The system of claim 16, wherein the multicast configuration includes a Multicast Label Distribution Protocol (MLDP) configuration, the multihomed network element further configured to:
receive the subscription for the multicast network flow at each particular network device that received the multicast data; and
provide the multicast data to the recipient edge network element from each particular network device.

20. The system of claim 16, wherein the multicast configuration includes a Multicast Label Distribution Protocol (MLDP) configuration, the multihomed network element further configured not to send the multicast data from the first network device to the second network device in the multihomed network element.

* * * * *